(12) United States Patent
Schott et al.

(10) Patent No.: US 7,792,754 B2
(45) Date of Patent: Sep. 7, 2010

(54) FINANCIAL DOCUMENT ITEM PROCESSING SYSTEM AND METHOD OF OPERATING A FINANCIAL DOCUMENT ITEM PROCESSING SYSTEM TO ENCODE/ENDORSE A FINANCIAL DOCUMENT ITEM HAVING A RADIO FREQUENCY IDENTIFICATION TAG

(75) Inventors: Susan H. Schott, Waterloo (CA); Sean K. O'Brien, Waterloo (CA); Sean Woodward, Waterloo (CA)

(73) Assignee: NCR Corporation, Duluth, GA (US)

( * ) Notice: Subject to any disclaimer, the term of this patent is extended or adjusted under 35 U.S.C. 154(b) by 2024 days.

(21) Appl. No.: 10/691,229

(22) Filed: Oct. 22, 2003

(65) Prior Publication Data
US 2005/0091162 A1 Apr. 28, 2005

(51) Int. Cl.
*G06Q 40/00* (2006.01)
(52) U.S. Cl. .............. 705/45; 705/40; 705/42; 705/43; 705/44; 705/16; 235/379; 235/380; 235/381
(58) Field of Classification Search .......... 705/45, 705/42, 43, 44, 16; 235/379, 380, 381
See application file for complete search history.

(56) References Cited

U.S. PATENT DOCUMENTS

| 5,936,527 | A  | * | 8/1999 | Isaacman et al. | ......... 340/572.1 |
| 6,547,151 | B1 | * | 4/2003 | Baldi | ......... 235/492 |
| 7,036,729 | B2 | * | 5/2006 | Chung | ......... 235/385 |
| 7,216,106 | B1 | * | 5/2007 | Buchanan et al. | ......... 705/45 |

OTHER PUBLICATIONS

Gyricon LLC and Episys Ltd. Form Partnership for Distribution and Support for Gyricon's Wireless SyncroSign eSignage Soultions. PR Newswire, pNA.*

* cited by examiner

*Primary Examiner*—Daniel S Felten
(74) *Attorney, Agent, or Firm*—Michael Chan, Esq.

(57) ABSTRACT

A financial document item processing system processes checks transported from an upstream end of a check transport path to a downstream end of the check transport path. Endorsement data is transmitted to an RFID tag of a check transported along the check transport path from the upstream end to the downstream end. Alternatively, encoded data is transmitted to an RFID tag of a check transported along the check transport path from the upstream end to the downstream end. In some financial document item processing applications, both endorsement data and encoded data are transmitted to an RFID tag of a check transported along the check transport path from the upstream end to the downstream end.

4 Claims, 10 Drawing Sheets

FINANCIAL DOCUMENT ITEM PROCESSING SYSTEM AND METHOD OF OPERATING A FINANCIAL DOCUMENT ITEM PROCESSING SYSTEM TO ENCODE/ENDORSE A FINANCIAL DOCUMENT ITEM HAVING A RADIO FREQUENCY IDENTIFICATION TAG

BACKGROUND OF THE INVENTION

The present invention relates to financial document item processing systems, and is particularly directed to a financial document item processing system and a method of operating a financial document item processing system, such as a multiple-pass image-based check processing system, to encode/endorse a financial document item having a radio frequency identification tag.

A typical multiple-pass image-based check processing system includes an image capture workstation which captures images of document items during a first pass of document items, and an encoding and sorting workstation which encodes and sorts document items during a second pass which is after the first pass. The image capture workstation includes an image capture item processing transport which has a document transport path and a number of different hardware devices lying along the document transport path for performing specific document processing operations on document items moving downstream along the document transport path. Hardware devices lying along the document transport path usually include an imaging camera disposed on one side of the document transport path for capturing an image of the frontside of a document item and another imaging camera disposed on the other side of the document transport path for capturing an image of the backside of the document item as the document item moves downstream along the document transport path. The image capture item processing transport has a plurality of pockets located at the downstream end of the document transport path. Each processed document item is directed into one of the pockets. The image capture workstation further includes an image capture transport processor which executes an image capture transport application program which is stored in memory to control operation of the hardware devices lying along the document transport path and thereby to control operation of the image capture item processing transport.

The encoding and sorting workstation includes an encoding and sorting item processing transport which has a document transport path and a number of different hardware devices lying along the document transport path for performing specific document processing operations on document items moving downstream along the document transport path. A typical hardware device lying along the document transport path comprises an encoder disposed on one side of the document transport path for encoding magnetic ink character recognition (MICR) information onto the frontside of a document item as the document item moves downstream along the document transport path. Another typical hardware device lying along the document transport path comprises an endorser disposed on one side of the document transport path for endorsing endorsement-type information onto the frontside (sometimes backside) of a document item as the document item moves downstream along the document transport path. The encoding and sorting item processing transport has a plurality of pockets located at the downstream end of the document transport path. Each processed document item is sorted and directed into one of the pockets. The encoding and sorting workstation further includes an encoding and sorting transport processor which executes an encoding and sorting transport application program which is stored in memory to control operation of the hardware devices lying along the document transport path and thereby to control operation of the encoding and sorting item processing transport.

During the second pass of document items on the encoding and sorting item processing transport, each physical document item is matched with its corresponding image data captured during the first pass of the document item on the image capture item processing transport. This matching must occur before the encoder of the encoding and sorting item processing transport can encode MICR information onto the associated physical document item. However, this matching need not occur before the endorser of the encoding and sorting item processing transport can endorse endorsement-type information onto a document item. The endorsement-type information may be endorsed onto each document item either before or after the document item is matched up with its corresponding image data which was captured during the first pass.

In some instances, a document item may need to be processed through more than one processing center before reaching its final destination. When a document item is processed through more than one processing center, the document item usually contains more than one encoded line and/or more than one endorsement line. When more than one encoded line and/or more than one endorsement line is made on a document item, the encoded lines and/or the endorsement lines may become cluttered and placed on top of each other on the document item. This makes it difficult to read each encoded line and/or each endorsement line. Also, an encoded line or an endorsement line may be faint and difficult to read at a later processing center if an ink ribbon for the encoder or an ink ribbon for the endorser is not properly maintained.

SUMMARY OF THE INVENTION

In accordance with one aspect of the present invention, a financial document item processing system for processing checks comprises means defining a check transport path along which checks can be transported from an upstream end of the check transport path to a downstream end of the check transport path, and endorsing means for transmitting endorsement data to an RFID tag of a check transported along the check transport path from the upstream end to the downstream end. The system may further comprise encoding means for transmitting encoded data to the RFID tag of the check transported along the check transport path from the upstream end to the downstream end.

In accordance with another aspect of the present invention, a financial document item processing system for processing checks comprises means defining a check transport path along which checks can be transported from an upstream end of the check transport path to a downstream end of the check transport path, and encoding means for transmitting encoded data to an RFID tag of a check transported along the check transport path from the upstream end to the downstream end.

In accordance with yet another aspect of the present invention, a multiple-pass check processing system has an image capture workstation for processing checks during a first pass of checks and an encoding and sorting workstation for processing checks during a second pass of checks. The system comprises means for processing a check transported along a check transport path of the image capture workstation during the first pass, and first transmitting means for transmitting encoded data to an RFID tag of the check transported along a check transport path of the encoding and sorting workstation during the second pass. The system may further comprise second transmitting means for transmitting endorsement data to the RFID tag of the check transported along the check transport path of the encoding and sorting workstation during the second pass.

In accordance with still another aspect of the present invention, a method of operating a financial document item processing system for processing checks comprises transmitting endorsement data to an RFID tag of a check transported along a check transport path of the item processing system from an upstream end of the check transport path to a downstream end of the check transport path. The method may further comprise transmitting encoded data to the RFID tag of the check transported along the check transport path from the upstream end to the downstream end.

In accordance with another aspect of the present invention, a method of operating a financial document item processing system for processing checks comprises transmitting encoded data to an RFID tag of a check transported along a check transport path of the item processing system from an upstream end of the check transport path to a downstream end of the check transport path.

In accordance with yet another aspect of the present invention, a method of operating a multiple-pass check processing system having an image capture workstation for processing checks during a first pass of checks and an encoding and sorting workstation for processing checks during a second pass of checks comprises processing a check transported along a check transport path of the image capture workstation during the first pass, and transmitting encoded data to an RFID tag of the check transported along a check transport path of the encoding and sorting workstation during the second pass. The method may further comprise transmitting endorsement data to the RFID tag of the check transported along the check transport path of the encoding and sorting workstation during the second pass.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
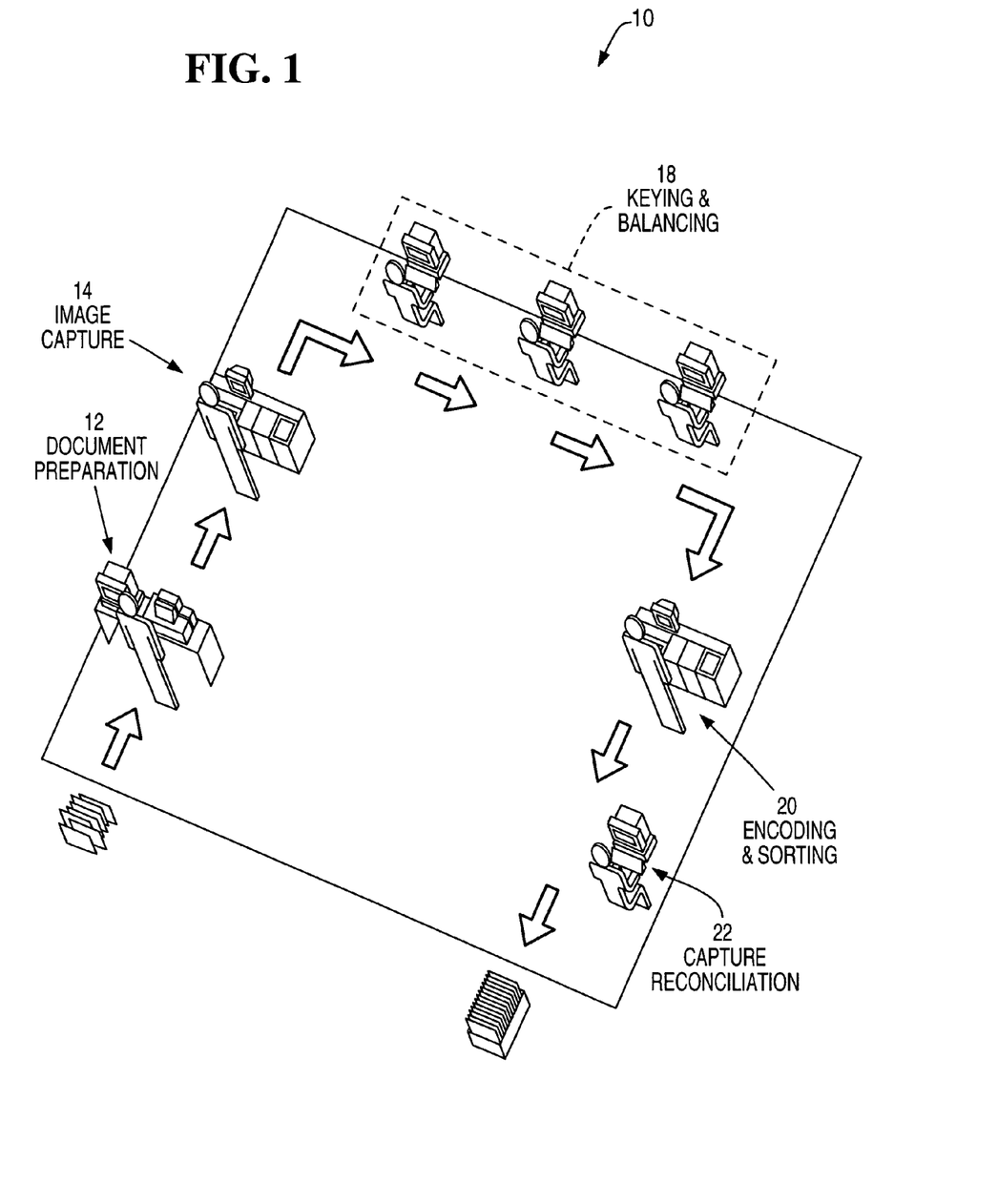
FIG. 1 is a diagram illustrating physical document item workflow in a multiple-pass image-based check processing system embodying the present invention.
Figure 2:
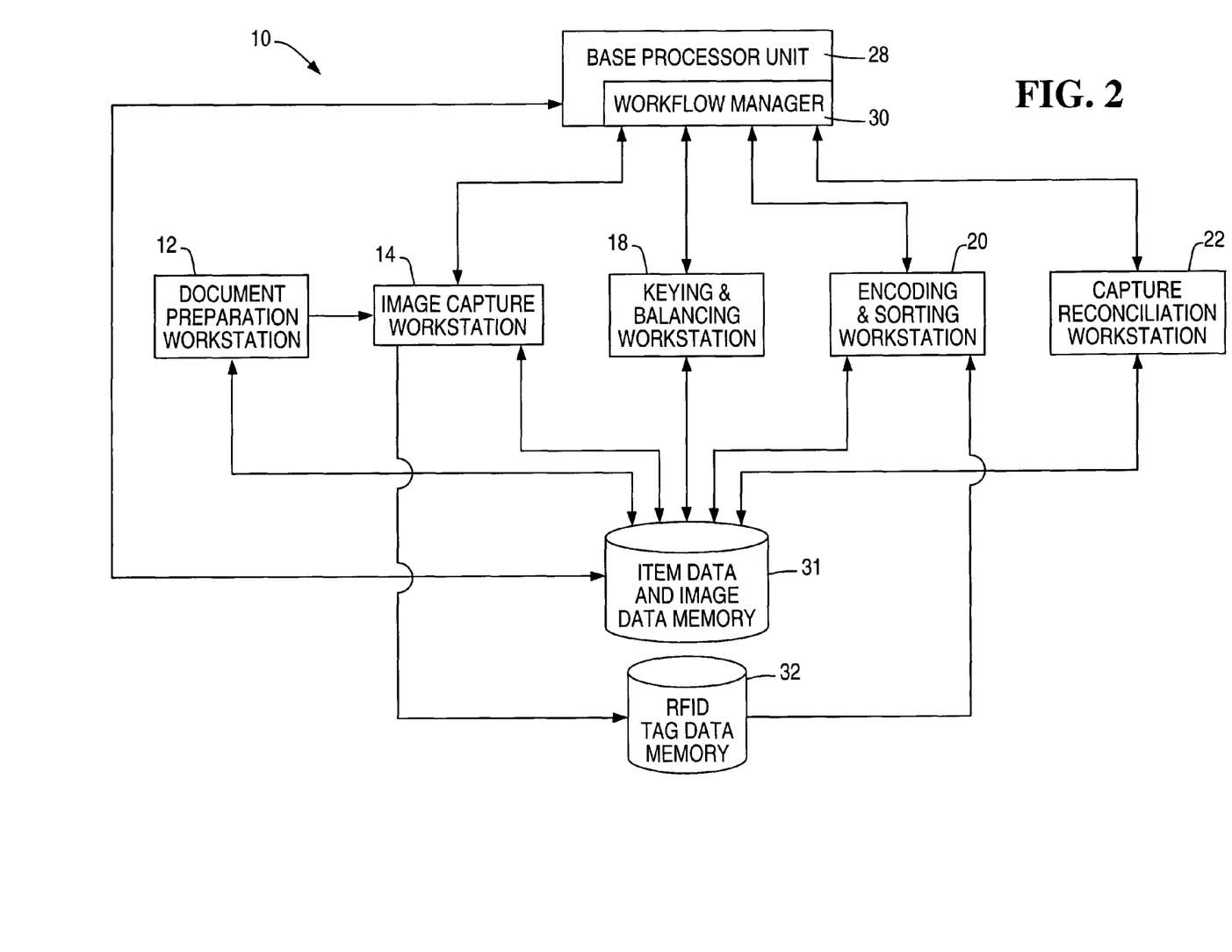
FIG. 2 is a schematic block representation of the multiple-pass image-based check processing system of FIG. 1.

The present invention is directed to a financial document item processing system and a method of operating a financial document item processing system to encode/endorse financial document item. The specific construction and use of the financial document item processing system may vary. By way of example, a financial document item processing system in the form of a multiple-pass image-based check processing system 10 is illustrated in FIGS. 1 and 2.

The multiple-pass image-based check processing system 10 comprises different types of workstations. The workstations may include a document preparation workstation 12, an image capture workstation 14, a recognition workstation (not shown), a keying and balancing workstation 18, an encoding workstation 20, and a capture reconciliation workstation 22. At the document preparation workstation 12, transaction items including a number of debit items and a number of credit items associated with each transaction are prepared for further processing downstream from the document preparation workstation 12. Typical transaction items include checks, deposit slips, and carrier documents (i.e., envelopes) which carry damaged checks. Preparation of the transaction items may include removal of paper clips, staples, and the like, and stacking of the items in a particular order and/or direction in suitable trays. The trays containing the stacked items are then manually carted to the image capture workstation 14.

The image capture workstation 14 creates units of work and submits the created work to a workflow manager 30 (FIG. 2) in a known way. Preferably, the image capture workstation 14 includes the Model iTRAN 8000 Item Processing System, manufactured by NCR Corporation, located in Dayton, Ohio. The workflow manager 30 resides in non-volatile memory in a base processor unit 28 of the image-based check processing system 10. Each of the workstations 16, 18, 20, 22 polls the workflow manager 30 in a known manner for work to perform, and may also create units of work which is submitted back to the workflow manager 30. A first memory unit 31 stores item data and image data memory 31, and a second memory unit 32 stores radio frequency identification (RFID) tag data in a manner to be described later. Although the first and second memory units 31, 32 are shown as being separate units, it is contemplated that the memory units may comprise a single memory unit.

Figure 3:
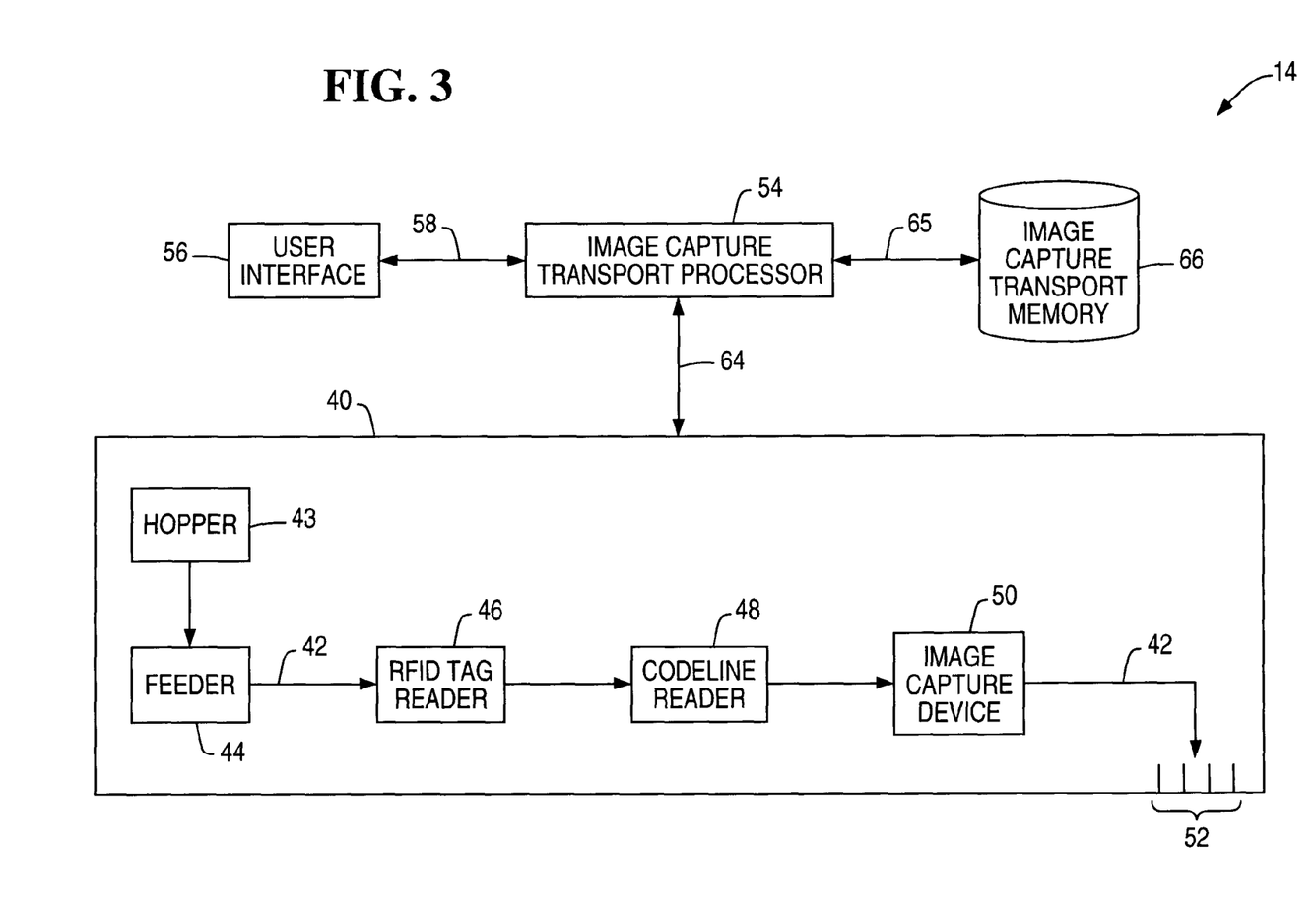
FIG. 3 is a schematic block representation of an image capture workstation in the system of FIGS. 1 and 2 and showing certain details.

Referring to FIG. 3, the image capture workstation 14 includes an image capture item processing transport 40 having a document track which defines a document transport path 42 along which financial document items, such as checks, can be transported from an upstream end to a downstream end. The image capture transport 40 includes a number of different hardware devices lying along the document transport path 42 for performing specific document processing operations on document items moving along the document transport path. The image capture transport 40 includes a document hopper 43 into which a stack of financial document items including checks are placed. More specifically, the stacked items in the trays are manually removed from the trays and placed into the document hopper 43.

A document feeder 44 adjacent the document hopper 43 selectively feeds or drives each document item from the stack of items in the hopper to transport the document item from the upstream end to the downstream end along the document transport path 42. Items are picked one-by-one from the document hopper 43 and transported along the document transport path 42 in a known manner. The document item is transported past each device along the document transport path 42 and eventually into one of a plurality of sorting bins 52 located at the end of the document transport path. Each device lying along the document transport path 42 processes each document item as the document item is transported past the device. The sorting bins 52 receive and pocket document items which have been processed along the document transport path 42 by the different devices. Accordingly, document items are moving from left to right (as viewed looking at FIG. 3).

Figure 6:
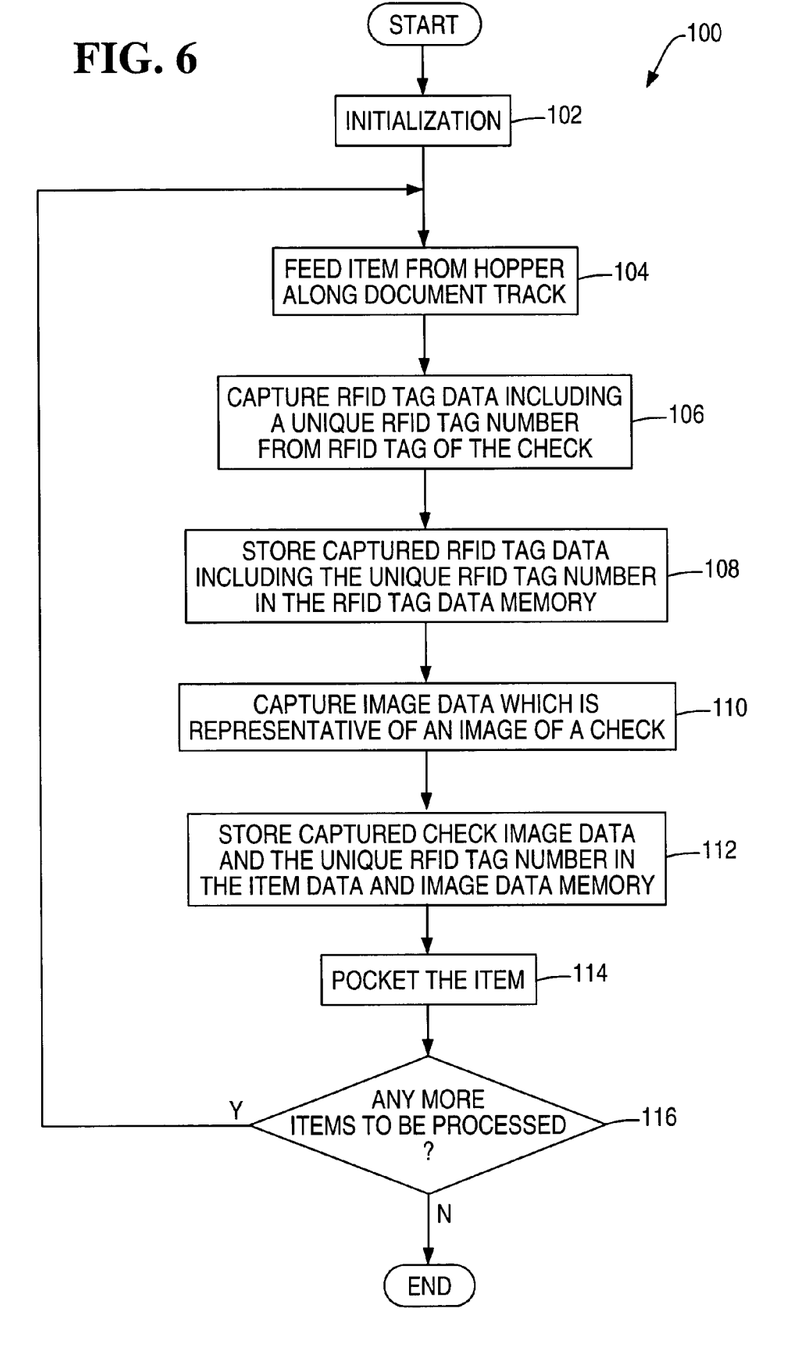
FIG. 6 is a flowchart depicting operation of an RFID tag data extracting application program carried out at the image capture workstation of FIGS. 3 and 4.

The image capture transport 40 further includes an RFID tag reader 46. The RFID tag reader 46 may be of the type which emits radio waves at a predetermined frequency at a number of different times. The range of the emitted radio waves depend upon a number of different factors including the predetermined frequency used and the power output of the emitted radio waves, as is known. The range of the emitted radio waves is set so that a "read window" is created along a portion of the document transport path 42. The structure and operation of RFID tag readers are well known and, therefore, will not be described. Operation of the RFID tag reader 46 in the present application will be described later when the flowchart of FIG. 6 is described.

A codeline reader 48, such as a MICR reader, located along the document transport path 42 reads a MICR codeline from each document item being processed in a known manner. Alternatively, the codeline reader may be an OCR reader instead of a MICR reader depending upon the particular application. An image capture device 50 located along the document transport path 42 includes an image lift camera (not shown) which is controlled to capture images of document items moving along the document transport path 42. More specifically, the image lift camera optically scans the front side of a document item as the document item moves along the document transport path 42 past the image lift camera to produce a front electronic image of the document item. The front image of the document item is stored in the memory unit 31 (FIG. 2). Other items (deposit slips or control documents including batch headers, for example) are processed in the same manner. It is contemplated that a rear image lift camera may also be used to lift an image of the rear of the document item. For simplicity, it is assumed that only an image of the front side of a document item is lifted and processed. The structure and operation of MICR readers, OCR readers, and image capture devices are well known and, therefore, will not be described.

If the document item moving downstream along the document transport path 42 is a check, the MICR reader 48 reads a MICR codeline at the bottom of the check as the check is transported past the MICR reader 48. Information from the MICR codeline of the check including a unique sequence number is associated with the front image of the check and is also stored in the memory unit 31. Accordingly, the front image of the check is stored in memory unit 31 along with a unique sequence number.

After the front image of the check is lifted by the image lift camera and the electronic image, the sequence number, and the MICR codeline are stored in the memory unit 31, the check is sorted into an appropriate one of the sorting bins 52.

Figure 7:
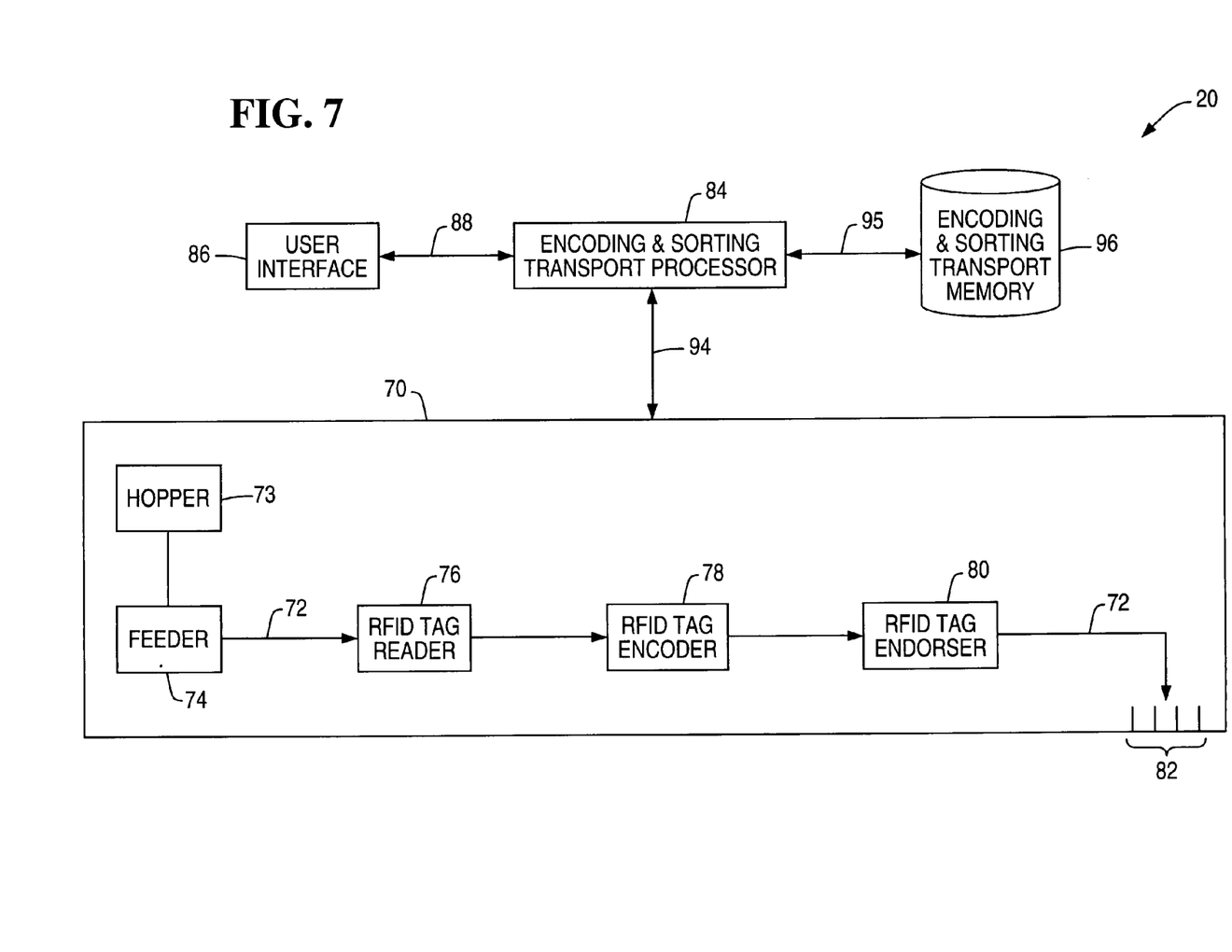
FIG. 7 is a schematic block representation of an encoding and sorting workstation in the system of FIGS. 1 and 2 and showing certain details.
Figure 8:
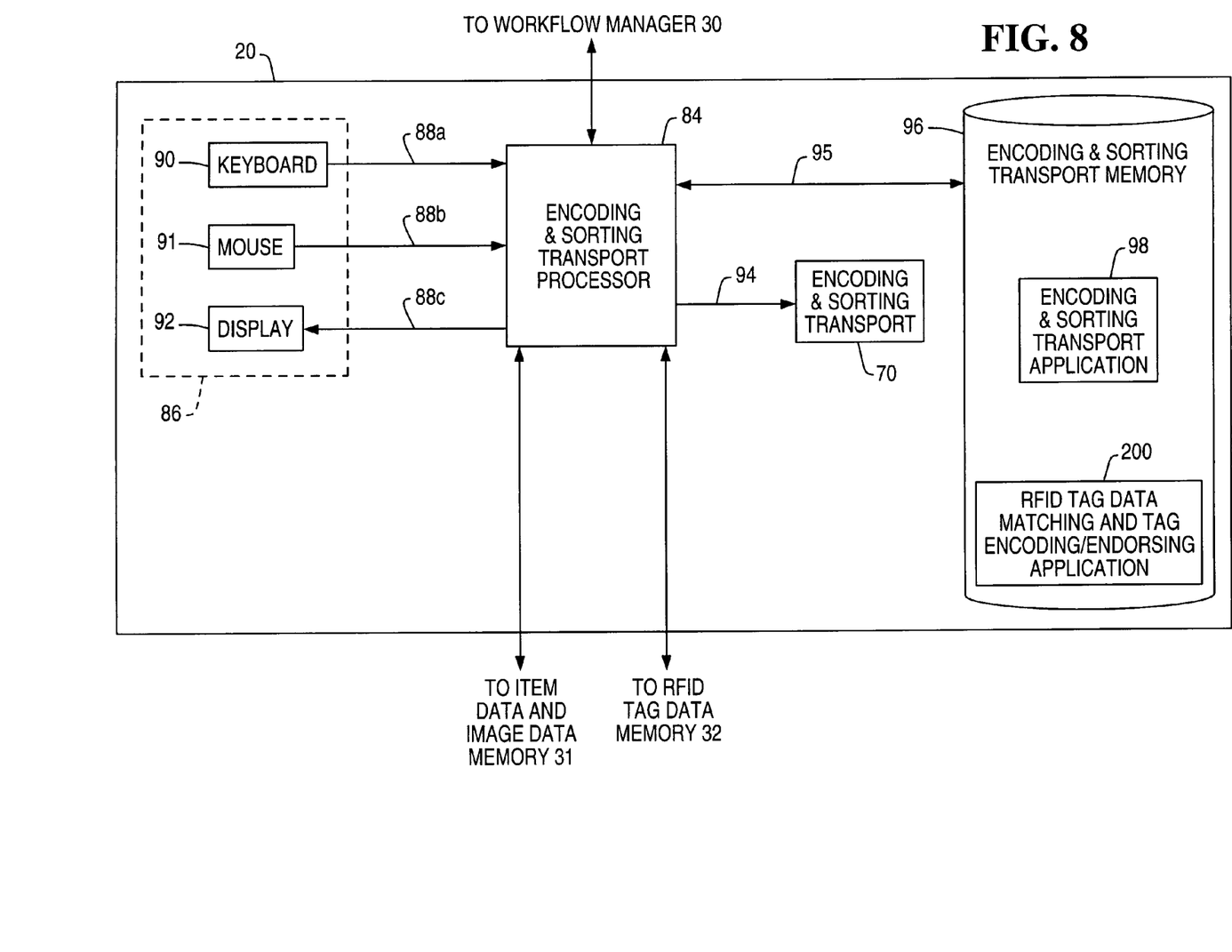
FIG. 8 is a schematic block representation of the encoding and sorting workstation of FIG. 7 and showing other details.

The sorted checks in each of the sorting bins 52 are stacked in a respective tray. The trays containing the stacked checks are then manually carted to the encoding workstation 20 (as shown in FIGS. 1, 7, and 8).

Figure 4:
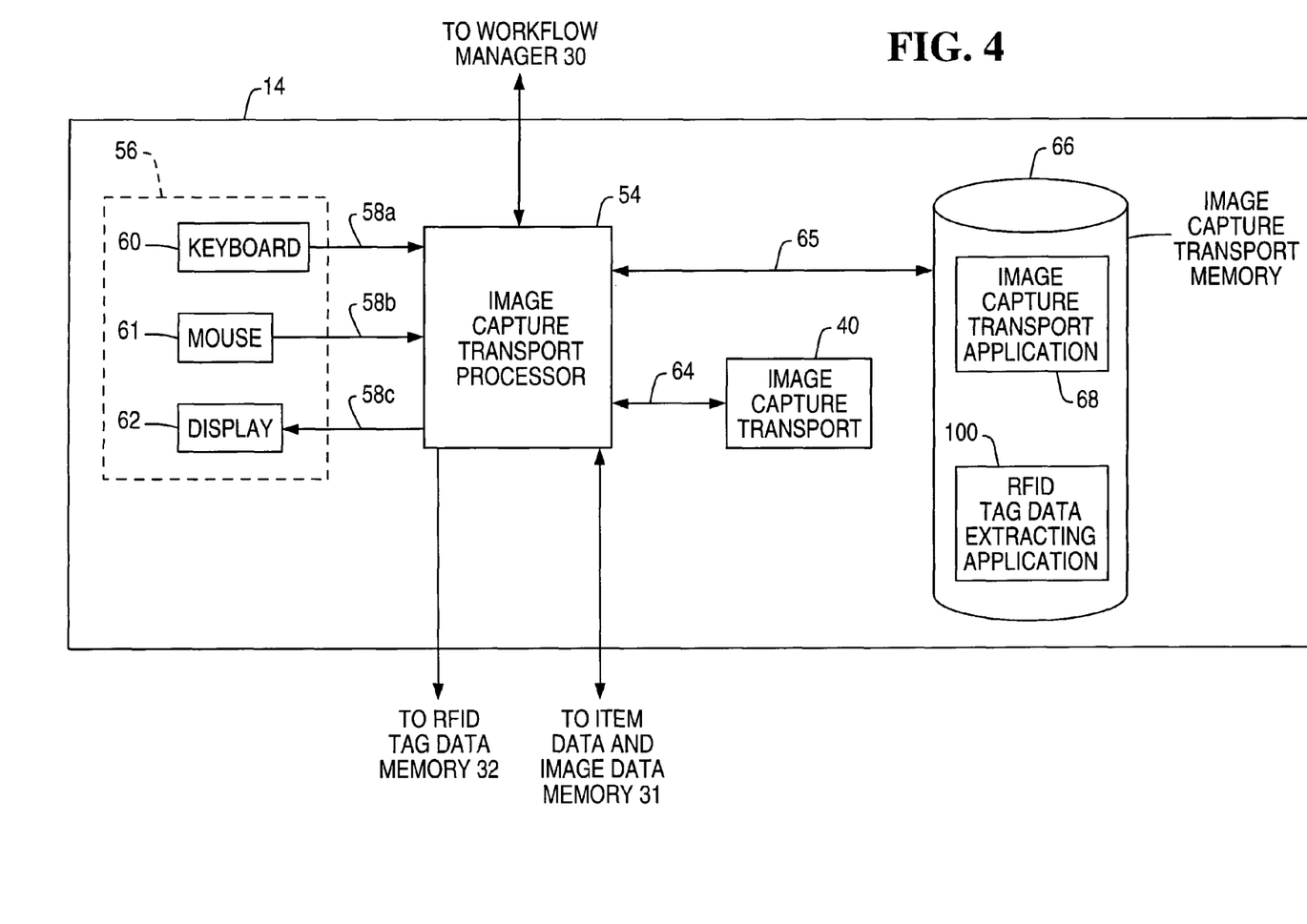
FIG. 4 is another schematic block representation of the image capture workstation of FIG. 3 and showing other details.

Referring to FIGS. 3 and 4, the image capture workstation 14 further includes an image capture transport processor 54 and an image capture transport user interface 56 which communicates via signals on line 58 (FIG. 3) with the image capture transport processor. The image capture transport user interface 56 includes a keyboard 60, a mouse 61, and a display 62, all of which communicate via signals on lines 58a, 58b, 58c (FIG. 4) with the image capture transport processor 54. The image capture transport processor 54 controls operation of the image capture transport 40 via signals on line 64. Suitable microcomputers and memories are readily available in the marketplace. Their structure and operation are well known and, therefore, will not be described.

The image capture workstation 14 also includes an image capture transport memory 66 which communicates via signals on line 65 with the image capture transport processor 54. It is contemplated that the image capture transport memory 66 could be a single memory unit or a plurality of different memory units. An executable image capture transport application program 68 is stored in the image capture transport memory 66. The image capture transport application program 68 is associated with a particular type of document processing work. For example, one type of work is proof of deposit. Another type of work is remittance processing. Still another type of work may be sorting of document items. When the image capture transport application program 68 is executed, the hardware devices lying along the document transport path 42 are controlled to process document items moving downstream along the document transport path in accordance with the image capture transport application program, as is known. The image capture transport memory 66 also stores an RFID tag data extracting program 100 which is described later when the flowchart of FIG. 6 is described.

Figure 5:
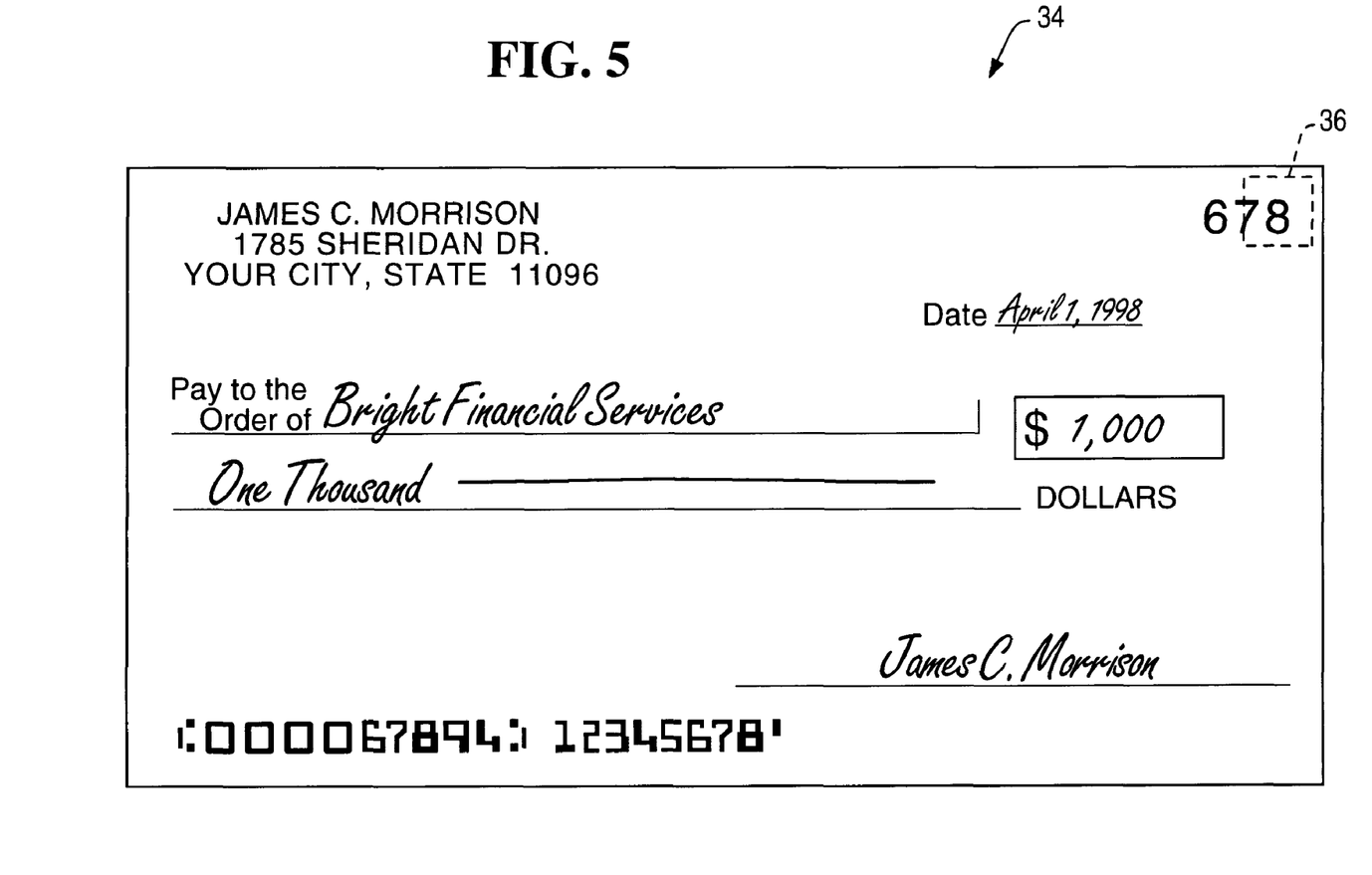
FIG. 5 is a diagram of a check having a radio frequency identification (RFID) tag.

Referring to FIG. 5, a check 34 has an RFID tag 36 associated therewith. The check 34 with the RFID tag 36 may be constructed in many different ways. For example, the RFID tag 36 may be bonded to a major side surface of the check 34. As another example, the RFID tag 36 may be embedded into the sheet material of the check 34 during manufacture of the check. The RFID tag 36 includes RFID circuitry (not shown) and an RFID antenna (also not shown), as is known. The circuitry typically includes a printed circuit board on which electronic components are mounted. The antenna may be of the inductive loop type, for example. The structure and operation of the RFID tag 36 are well known and, therefore, will not be described.

FIG. 6 is a flowchart which depicts operation of the RFID tag data extracting application program 100 which runs continuously as each document item is transported from the upstream end of the document transport path 42 towards the downstream end of the document transport path. After program initialization in step 102, the program proceeds to step 104 in which the document feeder 44 feeds document items from the document hopper 43 into the document transport path 42. As shown step 106, the RFID tag reader 46 captures RFID tag data including a unique RFID tag number from each RFID tagged check as the check is transported past the RFID tag reader. The unique RFID number for each check may comprise, for example, a 48-bit (or any other number of bit) number which is burned into a microchip of the RFID tag during manufacture of the RFID tag. Alternatively, the unique RFID number for each check may be written into either a write-once or a read/write chip during printing of the check, as another example. The captured RFID tag data is stored in the memory unit 32, as shown in step 108.

Then, in step 110, the image of the check is captured in the manner as was previously described in detail. The captured check image data and the unique RFID tag number which was captured in step 106 are stored in the memory unit 31, as shown in step 112. After the check image data is stored in the memory unit 31, the check is pocketed into one of the plurality of sorting bins 52 at the end of the document transport path 42, as shown in step 114. A determination is made in step 116 as to whether there are any more document items to be processed at the image capture workstation 14. If the determination is affirmative, the program returns to step 104 to process the next item in the same manner as just described hereinabove. The program ends if the determination in step 116 is negative.

As previously mentioned, trays containing stacked checks which have been processed at the image capture workstation 14 are manually carted to the encoding and sorting workstation 20, as shown in FIGS. 1, 7, and 8. The front electronic image, the sequence number, and the MICR codeline of each check stored in the memory unit 31 at the image capture workstation 14 are processed by the recognition workstation (not shown) and the keying and balancing workstation 18 in a known manner. Briefly, at the recognition workstation, the front electronic image of each check stored in the memory unit 31 is processed using known recognition techniques to determine the "amount" associated with the check. The amount of the check is then associated with the corresponding front electronic image and the MICR codeline of the check and stored in the memory unit 31. Amount keying, codeline completion, and balancing are performed, as needed, at the keying and balancing workstation 18, as is known. A one-to-one correspondence is thereby established between the front electronic image, the sequence number, the MICR codeline, and the amount associated with that particular check. Accordingly, a database containing the front electronic image, the sequence number, the MICR codeline, and the amount associated with each check is thereby created and stored in the memory unit 31.

Referring to FIG. 7, the encoding and sorting workstation 20 includes an encoding and sorting item processing transport 70 having a document track which defines a document transport path 72 along which the checks can be transported from an upstream end to a downstream end. Preferably, the encoding and sorting item processing transport 70 also includes the Model iTRAN 8000 Item Processing System, manufactured by NCR Corporation, located in Dayton, Ohio. The encoding and sorting transport 70 includes a number of different hardware devices lying along the document transport path 72 for performing specific document processing operations on checks moving along the document transport path. The encoding and sorting transport 70 includes a document hopper 73 into which the stack of checks is placed. More specifically, the stacked checks in the trays are manually removed from the trays and placed into the document hopper 73.

A document feeder 74 adjacent the document hopper 73 selectively feeds or drives each check from the stack of checks in the hopper to transport the check from the upstream end to the downstream end along the document transport path 72. Items are picked one-by-one from the document hopper 73 and transported along the document transport path 72 in a known manner. The check is transported past each device along the document transport path 72 and eventually into one of a plurality of sorting bins 82 located at the end of the document transport path. Each device lying along the document transport path 72 processes each item as the document item is transported past the device. The sorting bins 82 receive and pocket checks which have been processed along the document transport path 72 by the different devices. Accordingly, checks are moving from left to right (as viewed looking at FIG. 7).

The encoding and sorting transport 70 further includes an RFID tag reader 76 similar to the RFID tag reader 46 in the image capture transport 70. After the RFID tag reader 76 reads RFID tag data including the unique RFID tag number from each check, the RFID tag data including the unique RFID tag number is used in a manner to be described hereinbelow for the purpose of encoding information onto that particular check.

The encoding and sorting transport 70 also includes an RFID tag encoder 78 disposed along the document transport path 72. The RFID tag encoder 78 transmits encoded information to an RFID tag of a check, such as the RFID tag 36 of the check 34 shown in FIG. 5, so that the encoded information can be stored in the RFID tag of the check. The encoding and sorting transport 70 includes an RFID tag endorser 80 disposed along the document transport path 72. The RFID tag endorser 80 transmits endorsement information to an RFID tag of a check, so that the endorsement information can be stored in the RFID tag of the check.

It is contemplated that the RFID tag encoder 78 may comprise a conventional RFID tag reader which is also capable of writing data to an RFID tag. As an alternative, the RFID tag encoder 78 may comprise a custom-designed RFID device which is dedicated to only writing data to an RFID tag. Similarly, the RFID tag endorser 80 may comprise a conventional RFID tag reader which is also capable of writing data to an RFID tag, or as an alternative, the RFID tag endorser 80 may comprise a custom-designed RFID device which is dedicated to only writing data to an RFID tag. Since the RFID tag endorser 80 only needs to write to an RFID tag, it is preferably that the endorser be a write-only type of RFID device. Operation of the RFID tag encoder 78 and operation of the RFID tag endorser 80 in the present application will be described later when the flowchart of FIG. 9 is described.

Referring to FIGS. 7 and 8, the encoding and sorting workstation 20 further includes an encoding and sorting transport processor 84 and an encoding and sorting transport user interface 86 which communicates via signals on line 88 (FIG. 7) with the encoding and sorting transport processor 84. The encoding and sorting transport user interface 86 includes a keyboard 90, a mouse 91, and a display 92, all of which communicate via signals on lines 88*a*, 88*b*, 88*c* (FIG. 8) with the encoding and sorting transport processor 84. The encoding and sorting transport processor 84 controls operation of the encoding and sorting transport 70 via signals on line 94. Suitable microcomputers and memories are readily available in the marketplace. Their structure and operation are well known and, therefore, will not be described.

The encoding and sorting workstation 20 also includes an encoding and sorting transport memory 96 which communicates via signals on line 95 with the encoding and sorting transport processor 84. It is contemplated that the encoding and sorting transport memory 96 could be a single memory unit or a plurality of different memory units. An executable encoding and sorting transport application program 98 is stored in the encoding and sorting transport memory 96. The encoding and sorting transport application program 98 is associated with a particular type of document processing work. When the encoding and sorting transport application program 98 is executed, the hardware devices lying along the document transport path 72 are controlled to process document items moving downstream along the document transport path in accordance with the encoding and sorting transport application program, as is known. The encoding and sorting transport memory 96 also stores an RFID tag data matching and tag encoding/endorsing application program 200 to be described in more detail hereinbelow.

Figure 9:
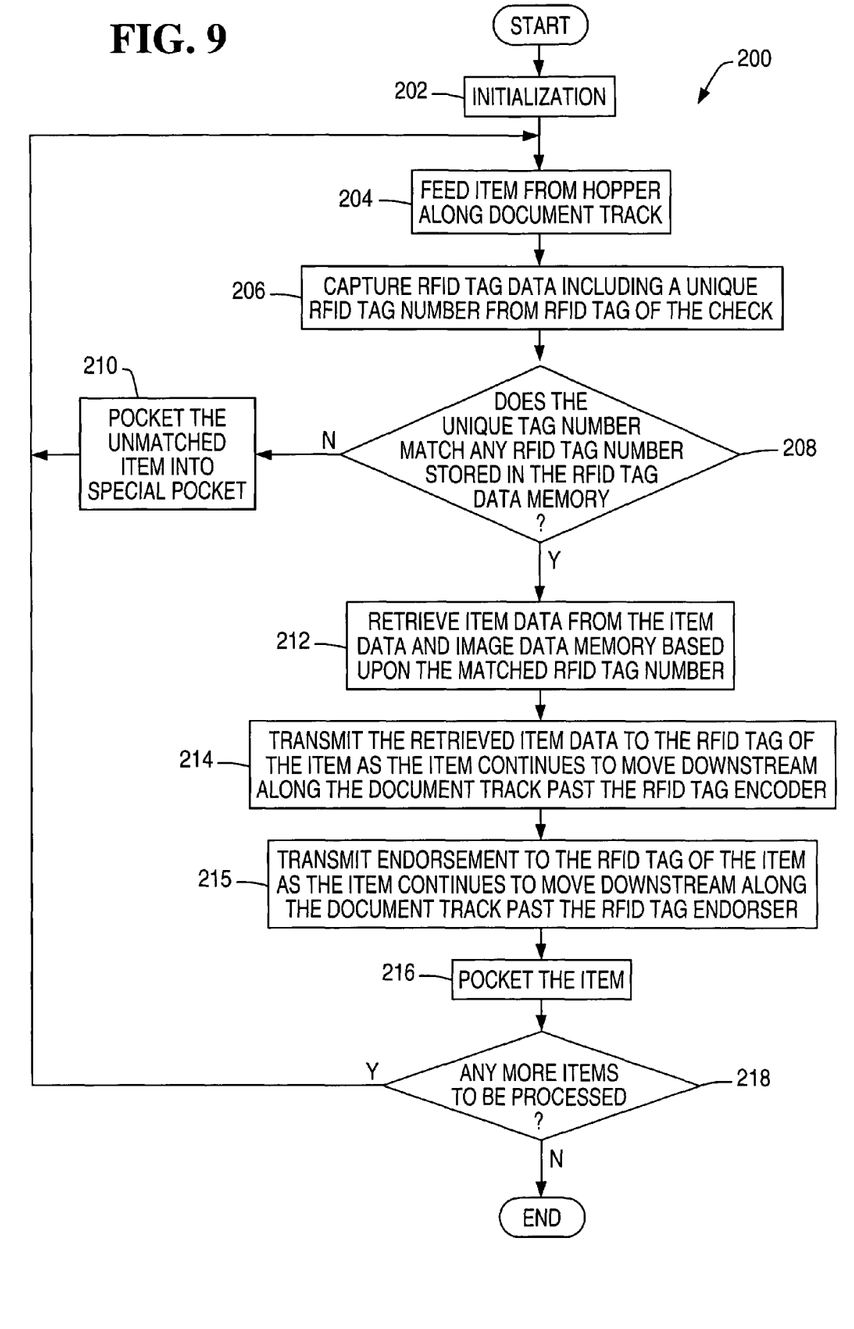
FIG. 9 is a flowchart depicting operation of an RFID tag data matching and tag encoding/endorsing application program carried out at the encoding and sorting workstation of FIGS. 7 and 8.

FIG. 9 is a flowchart which depicts operation of the RFID tag data matching and tag encoding/endorsing application program 200 which runs continuously as each check is transported from the upstream end of the document transport path 72 towards the downstream end of the document transport path. After program initialization in step 202, the program proceeds to step 204 in which the document feeder 74 feeds checks from the document hopper 73 into the document transport path 72. As shown step 206, the RFID tag reader 76 captures RFID tag data including a unique RFID tag number from each RFID tagged check, such as the check 34 of FIG. 5, as the check is transported past the RFID tag reader.

The captured unique RFID tag number is compared with unique RFID tag numbers which were captured at the image capture workstation 14 and stored in the RFID tag data memory 32 (FIG. 2), as shown in step 208, to determine if there is a match. If the determination in step 208 is negative, the program proceeds to step 210 in which the unmatched check is transported along the document transport path 72 into a particular one of the plurality of sorting bins 82 at the end of the document transport path. However, if the determination in step 208 is affirmative, the program proceeds to step 212 in which item data is retrieved from the item data and image data memory 31. The item data is retrieved based upon the unique RFID tag number which was matched in step 208. Then, as shown in step 214, the RFID tag encoder 78 encodes this retrieved item data by transmitting the retrieved item data to the RFID tag of the corresponding check presently being transported along the document transport path 72 as the check moves downstream past the RFID tag encoder. Then, as shown in step 215, the RFID tag endorser 80 transmits endorsement-type data to the RFID tag of the check presently being transported along the document transport path 72 as the check continues to move downstream past the RFID tag endorser.

Although the encoding and the endorsing are transmitted in two separate steps (i.e., step 214 and step 215 as shown in FIG. 9), it is conceivable that both of these steps may be combined into a single step in which the encoded data and the endorsement-type data are transmitted at the same time to the RFID tag of the corresponding check being transported along the document transport path 72. This may require the encoded data and the endorsement-type data to be first consolidated before transmitting the data to the RFID tag.

After the encoded information and the endorsement information are transmitted to the RFID tag of the check, the check is pocketed into one of the plurality of sorting bins 82 at the end of the document transport path 72, as shown in step 216. A determination is then made in step 218 as to whether there are any more checks to be processed at the encoding and sorting workstation 20. If the determination is affirmative, the program returns to step 204 to process the next item in the same manner as just described hereinabove. The program ends if the determination in step 218 is negative. After checks have been processed at the encoding and sorting workstation 20, a small number of exception items (such as free items and missing items) are reconciled at the capture reconciliation workstation 22, as is known.

Figure 10:
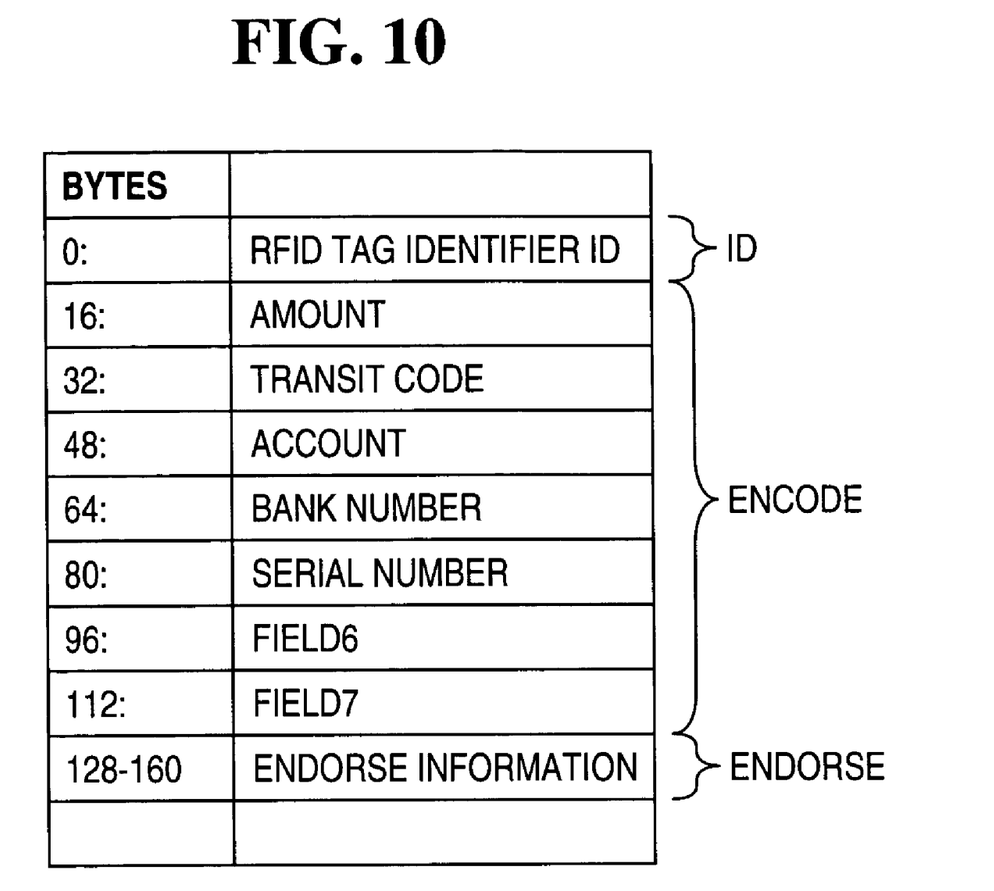
FIG. 10 is an exemplary data format of encoded information and endorsement information stored in the RFID tag of the check of FIG. 5.

It should be apparent that the encoded information associated with each check is stored in the RFID tag of that check as well as in the memory unit 31. Further, it should be apparent that endorsement information is stored in the RFID tag of each check as well as in the memory unit 31. A typical data format of the encoded information and the endorsement information stored in the RFID tag of each check is shown in FIG. 10. The data format shown in FIG. 10 is exemplary only.

The data format shown in FIG. 10 includes a data block of 160 bytes in which sixteen bytes are provided for an RFID tag identifier ID, 112 bytes are provided for the encoded information, and thirty-two bytes are provided for the endorsement information. It is contemplated that multiple lines of encoded information and/or multiple lines of endorsement information may be stored on the RFID tag of each check. Some of the multiple lines of encoded information and/or some of the multiple lines of endorsement information may be from different processing centers. When there are multiple lines of encoded information and/or multiple lines of endorsement information to be stored on the RFID tag, the data block would need to include additional bytes to accommodate the additional encoded information and/or the additional endorsement information.

It should also be apparent that the memory unit 31 stores sequence numbers, MICR codelines, and image data associated with transaction items which have been processed in accordance with the image capture transport application program 68 stored in the image capture transport memory 66 during the first pass at the image capture workstation 14. The memory unit 31 also stores encoded information and endorsement information of transaction items which have been processed in accordance with the encoding and sorting transport application program 98 stored in the encoding and sorting transport memory 96 during the second pass at the encoding and sorting workstation 20. The memory unit 32 stores RFID tag data including unique RFID tag numbers captured from checks by the RFID tag reader 46 during the first pass of document items on the image capture workstation 14. The item data encoded onto a particular check during the second pass at the encoding and sorting workstation 20 is based upon the unique RFID tag numbers captured during the first pass at the image capture workstation 14.

A number of advantages are provided by the image-based check processing system 10 in accordance with the present invention. One advantage is that any encoded line(s) and/or endorsement line(s) on a document item need not be cluttered and on top of each other. Another advantage is that any encoded line(s) and/or endorsement line(s) on a document item need not be faint or difficult to read. Since data representative of any encoded line(s) and/or endorsement line(s) is stored in the RFID tag of the check, any bank including the bank which transmitted the data to the RFID tag can at any time later retrieve the data from the RFID tag to obtain the encoded line(s) and/or endorsement line(s) for that check.

Although the above description describes the RFID tag encoder 78 located along the document transport path 72 between the RFID tag reader 76 and the RFID tag endorser 80 in the encoding and sorting transport 70, it is contemplated that the RFID tag encoder 78 and the RFID tag endorser 80 may be positioned at any location. It is also contemplated that either only the RFID tag encoder 78 or only the RFID tag endorser 80 be used. If only the RFID tag encoder 78 is used, a conventional endorser may be used. Similarly, if only the RFID tag endorser 80 is used, a conventional encoder may be used. It is conceivable that a conventional encoder be used along with the RFID tag encoder 78, and that a conventional endorser be used along with the RFID tag endorser 80. It is also conceivable that neither the RFID tag reader 46 (FIG. 3) nor the RFID tag reader 76 (FIG. 7) need be used when either the RFID tag encoder 78 or the RFID tag endorser 80 is used.

Further, although the above description describes a multiple-pass image-based check processing system, it is contemplated that the present invention may be embodied in a single-pass image-based check processing system. For example, it is contemplated that an RFID tag endorser may be used in a single-pass image capture workstation which comprises the Model iTRAN 8000 Item Processing System, manufactured by NCR Corporation, located in Dayton, Ohio.

Moreover, although the above description describes an RFID tag endorser being used on the second pass of a two-pass check processing application, it is contemplated that the RFID tag endorser may be used on the first pass instead of the second pass. It is also conceivable that two separate RFID tag endorsers be used on the two-pass check processing application. One RFID tag endorser would be used on the first pass, and the other RFID tag endorser would be used on the second pass.

Also, although the above description describes the RFID tag data extracting application program 100 and the RFID tag data matching and tag encoding/endorsing application program 200 as being used in an image-based financial document processing system, it is contemplated that the programs 100, 200 may be used in a non-image-based financial document processing system.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A financial document item processing system for processing a check having a radio frequency identification (RFID) tag associated therewith, the system comprising:
    a check transport path along which the check can be transported from an upstream end of the check transport path to a downstream end of the check transport path;
    an RFID tag endorser disposed along the check transport path and for wirelessly transmitting check endorsement data to the RFID tag of the check transported along the check transport path from the upstream end to the downstream end; and
    an RFID tag encoder for wirelessly transmitting magnetic ink character recognition (MICR) encoded data to the RFID tag of the check transported along the check transport path from the upstream end to the downstream end.

2. A financial document item processing system for processing a check having a radio frequency identification (RFID) tag associated therewith, the system comprising:
    a check transport path along which the check can be transported from an upstream end of the check transport path to a downstream end of the check transport path; and
    an RFID tag encoder disposed along the check transport path and for wirelessly transmitting magnetic ink character recognition (MICR) encoded data to the RFID tag of the check transported along the check transport path from the upstream end to the downstream end.

3. A method of operating a financial document item processing system for processing a check having a radio frequency identification (RFID) tag associated therewith, the method comprising:
    wirelessly transmitting check endorsement data to the RFID tag of the check transported along a check transport path of the item processing system from an upstream end of the check transport path to a downstream end of the check transport path; and
    wirelessly transmitting magnetic ink character recognition (MICR) encoded data to the RFID tag of the check transported along the check transport path from the upstream end to the downstream end.

4. A method of operating a financial document item processing system for processing a check having a radio frequency identification (RFID) tag associated therewith, the method comprising:
    wirelessly transmitting magnetic ink character recognition (MICR) encoded data to the RFID tag of the check transported along a check transport path of the item processing system from an upstream end of the check transport path to a downstream end of the check transport path.

* * * * *